(12) United States Patent
Chou et al.

(10) Patent No.: US 11,718,119 B2
(45) Date of Patent: Aug. 8, 2023

(54) COATING COMPOSITION FOR PRINTING PAPER

(71) Applicant: HEWLETT-PACKARD DEVELOPMENT COMPANY, L.P., Spring, TX (US)

(72) Inventors: Beverly Chou, San Diego, CA (US); Xiaoqi Zhou, San Diego, CA (US); Xulong Fu, San Diego, CA (US); Jake Thomas, San Diego, CA (US); Tao Chen, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/439,205

(22) PCT Filed: Oct. 11, 2019

(86) PCT No.: PCT/US2019/055830
§ 371 (c)(1),
(2) Date: Sep. 14, 2021

(87) PCT Pub. No.: WO2021/071505
PCT Pub. Date: Apr. 15, 2021

(65) Prior Publication Data
US 2022/0154402 A1    May 19, 2022

(51) Int. Cl.
*B41M 5/52*    (2006.01)
*B41M 5/00*    (2006.01)
*D21H 19/40*    (2006.01)
*C08K 3/22*    (2006.01)
*C08K 3/34*    (2006.01)

(52) U.S. Cl.
CPC ........ *B41M 5/5218* (2013.01); *B41M 5/0017* (2013.01); *D21H 19/40* (2013.01); *C08K 3/22* (2013.01); *C08K 3/346* (2013.01); *C08K 2003/2227* (2013.01)

(58) Field of Classification Search
None
See application file for complete search history.

(56) References Cited

U.S. PATENT DOCUMENTS

| | | | |
|---|---|---|---|
| 5,997,625 A | 12/1999 | Londo et al. | |
| 6,468,343 B1 | 10/2002 | Pruett et al. | |
| 6,478,865 B1 | 11/2002 | Malla et al. | |
| 8,053,044 B2 | 11/2011 | Zhou et al. | |
| 8,173,227 B2 | 5/2012 | Morohoshi et al. | |
| 2008/0273045 A1* | 11/2008 | Morohoshi | B41M 5/5218 346/135.1 |
| 2009/0035478 A1* | 2/2009 | Zhou | B41M 5/52 427/466 |

FOREIGN PATENT DOCUMENTS

| | | |
|---|---|---|
| DE | 102006042167 A1 | 10/2010 |
| JP | 4280296 B2 | 6/2009 |
| WO | WO-2010114009 A1 | 10/2010 |
| WO | WO-2019099372 A1 | 5/2019 |

OTHER PUBLICATIONS

Datasheet for FULACOLOR-XW p. 1-2 (Year: 2016).*

* cited by examiner

*Primary Examiner* — Robert T Butcher
(74) *Attorney, Agent, or Firm* — HP Inc. Patent Department

(57) ABSTRACT

A coating composition for a base paper is described. The coating composition comprises a porous clay and an ink pigment fixation agent. The porous clay comprises an alumina-silicate, and has a surface area from 100 m2/g to 400 m2/g.

19 Claims, 1 Drawing Sheet

COATING COMPOSITION FOR PRINTING PAPER

CROSS-REFERENCE TO RELATED APPLICATIONS

This Utility Patent Application is a U.S. National Stage filing under 35 U.S.C. § 371 of PCT/US2019/055830, filed Oct. 11, 2019, incorporated by reference herein.

BACKGROUND

High speed inkjet web presses can print images on coated paper at speeds of up to 1000 feet per minute. To meet the requirements of certain specialty applications, such as silk and glossy direct mail paper and glossy magazine paper, coated papers that meet the specific surface requirements demanded by high-speed inkjet printing must be used. Several challenges arise, however, in use of these coated papers. Under high printing speeds, the closed-out structure of typical coated papers forces the printing ink to remain on the surface of the paper coating. This causes durability issues in printed image regions of the sheet.

BRIEF DESCRIPTION OF THE DRAWINGS

The figures depict several examples of the present disclosure. It should be understood that the present disclosure is not limited to the examples depicted in the figures.

DETAILED DESCRIPTION

Figure 1:
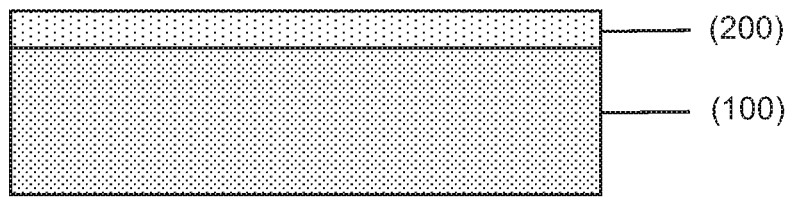
FIG. 1 shows an example of a cross-sectional view of a print medium in accordance with the present disclosure.

As used in the present disclosure, the term "about" is used to provide flexibility to an endpoint of a numerical range. The degree of flexibility of this term can be dictated by the particular variable and is determined based on the associated description herein.

Amounts and other numerical data may be expressed or presented herein in a range format. It is to be understood that such a range format is used merely for convenience and brevity and thus should be interpreted flexibly to include not just the numerical values explicitly recited as the limits of the range, but also to include individual numerical values or sub-ranges encompassed within that range as if each numerical value and sub-range is explicitly recited.

As used in the present disclosure, the term "comprises" has an open meaning, which allows other, unspecified features to be present. This term embraces, but is not limited to, the semi-closed term "consisting essentially of" and the closed term "consisting of". Unless the context indicates otherwise, the term "comprises" may be replaced with either "consisting essentially of" or "consists of".

It is noted that, as used in this specification and the appended claims, the singular forms "a", "an" and "the" include plural referents unless the context clearly dictates otherwise.

The present disclosure refers herein to a coating composition for a base paper, a print medium for inkjet printing and to a method of preparing a print medium. The present disclosure is concerned with a print medium having the capability to be inkjet printed at high speeds with high instant durability and image quality. Use of the coating composition on a base paper can produce high gloss media.

The coating composition comprises a porous clay and an ink pigment fixation agent. The porous clay comprises an alumina-silicate. The porous clay has a surface area from about 100 $m^2/g$ to about 400 $m^2/g$.

The print medium comprises: a base paper; a coating layer disposed on a surface of the base paper; and an ink pigment fixation agent disposed at a surface of the coating layer. The coating layer comprises a porous clay. The porous clay comprises an alumina-silicate, and has a surface area from about 100 $m^2/g$ to about 400 $m^2/g$.

The method comprises applying a coating composition onto a surface of a base paper. The coating composition comprises a porous clay and an ink pigment fixation agent. The porous clay comprises an alumina-silicate, and has a surface area from about 100 $m^2/g$ to about 400 $m^2/g$.

It is to be understood that this disclosure is not limited to the coating compositions, print media or methods disclosed herein. It is also to be understood that the terminology used in this disclosure is used for describing particular examples.

The coating composition can be in the form of a powder or an aqueous dispersion or slurry.

The coating composition comprises a porous clay. The coating composition may be disposed on surface of a base paper as, for example, a coating layer.

The coating composition can include particles of the porous clay. The particles of the porous clay may have a median particle size (D50) of about 0.1 microns to about 20.0 microns, such as about 1.0 to about 15.0 microns. In one example, the particles of the porous clay have a median particle size (D50) of about 1.5 to about 10.0 microns, such as about 2.0 to about 5.0 microns.

Inkjet inks are generally water-based inks containing colorants, which are either pigments or dyes. The capability and speed of a base paper to absorb the solvent of the inks is critical to the media used in digital inkjet web press printing. When standard coated print media, such as offset paper, were used in a high speed, digital web press, challenges have been encountered. Poor image quality such as ink bleed coupled with poor black and colour optical density are among the problems that arise. Another problem with using traditional print media with a high speed, inkjet web press relates to the slow ink absorption rate of the media, which requires an extended ink drying time. Such extended drying times limit the speed at which printing can be performed.

The term "clay" as used herein refers to a clay mineral. The clay or clay mineral includes a hydrous aluminium phyllosilicate. A phyllosilicate includes sheets, such as parallel sheets, of silicate tetrahedra with $Si_2O_5$ (e.g. a 2:5 atomic ratio).

The clay is a porous clay. The pores in the clay can absorb any liquid from the ink printed onto the surface of the print medium. At high printing speeds, the liquid can be rapidly removed from this surface, such that any solid components that were dispersed in the ink remain on the surface.

The porous clay may be a microporous clay, a mesoporous clay or a macroporous clay. A microporous clay has pores smaller than 2 nm in diameter, a mesoporous clay has pores with diameters between 2 and 50 nm, and a macroporous clay has pores larger than 50 nm in diameter (in accordance with the IUPAC definitions of microporous, mesoporous and macroporous). In one example, the porous clay is a microporous clay. The pore sizes of the clay can be measured by gas adsorption/desorption (e.g. 77K for $N_2$ adsorption using the BJH (Barrett, Joyner, Helenda) method for mesopores or the HK (Horvath and Kawazoe) method for micropores) or by mercury intrusion porosimetry for (e.g. using the Washburn equation for macropores).

The porous clay can have an oil absorption of at least about 70 g/100 g, such as at least about 75 g/100 g. The porous clay can have an oil absorption from about 75 g to about 350 g/100 g, such as about 80 g to about 250 g/100 g or, for example, from about 85 g to about 200 g/100 g. In one example, the porous clay has an oil absorption of about 80 g to 150 g/100 g, such as 85 g to 125 g/100 g. The values for oil absorption are defined in terms of the mass (e.g. 100 g) of porous clay. Oil absorption can be measured in accordance with ASTM D281-12(2016) [Standard Test Method for Oil Absorption of Pigments by Spatula Rub-out].

The porous clay has a surface area from about 100 $m^2/g$ to about 400 $m^2/g$. The porous clay can have a surface area of at least about 150 $m^2/g$, such as from about 150 $m^2/g$ to about 375 $m^2/g$. In one example, the porous clay has a surface area of at least about 200 $m^2/g$, such as from about 200 $m^2/g$ to about 350 $m^2/g$ or, for example, from about 250 $m^2/g$ to about 320 $m^2/g$. The surface area of the porous clay may be measured by gas adsorption/desorption (e.g. 77K for $N_2$ adsorption for determination of the surface area by the BET method). The porous clay may be qualitatively described as having a moderate surface area.

The porous clay comprises an alumina-silicate. For the avoidance of doubt, the porous clay is not a molecular sieve, such as a zeolite.

The porous clay is a clay mineral. The clay mineral comprises $Al_2Si_2O_5(OH)_4$. The clay mineral has a layered microscopic structure.

The clay mineral may be halloysite, kaolinite, illite, montmorillonite, vermiculite, palygorskite, pyrophyllite, bentonite or a combination thereof. In one example, the clay mineral includes bentonite.

The porous clay does not include silica ($SiO_2$), alumina ($Al_2O_3$), fumed silica (pyrogenic silica) or fumed alumina. Besides the expense of using these materials as fillers, they can be problematic in the manufacturing process because they are very difficult to disperse. These materials may not be compatible with the ink pigment fixation agent.

The porous clay can be an acid-etched clay (also known as an acid leached clay). The acid-etched clay is, for example, obtainable by mixing a clay with an acid. The clay may be mixed with the acid by shearing.

The clay that is mixed with an acid can be a non-porous clay and/or a clay having a surface area less than 100 $m^2/g$, such as less than 70 $m^2/g$ or less than 50 $m^2/g$.

The acid can be inorganic acid or an organic acid. The acid may be selected from hydrochloric acid, nitric acid and sulfuric acid. In one example, the acid is sulfuric acid. In one example, the pH of the acid is no greater than 6, such as by using by 25% sulphuric acid.

The acid-etched clay can be neutralized to a higher pH after treatment with the acid.

The acid-etched clay is a porous clay as defined hereinabove.

The acid-etched clay may be commercially available. an incubation period, the samples are washed and the newly formed high surface area clays with microchannels or microholes on the surface are filtered and dried. Alternatively, the acid treated high surface area clays can be selected from commercial products (e.g. FULACOLOR-NS, FULACOLOR-SR, FULACOLOR-XW, FULCAT-22 B OR FULCAT-435 from BYK Additive Limited).

In general, the porous clay is used in acidic condition, such as a pH from about 2 to about 7. This can, for example, be achieved by using the acid-etched clay as made or by using it as received commercially.

In general, the coating composition includes an amount of the porous clay of about 2.5 wt % to about 75.0 wt %, such as about 5.0 wt % to about 50.0 wt %. The coating composition may include an amount of the porous clay of about 7.5 wt % to about 35.0 wt %, such as about 10.0 wt % to about 25.0 wt %. In one example, the coating composition includes an amount of the porous clay of about 15.0 wt % to about 25.0 wt %.

The coating composition or coating layer may comprise an ink pigment fixation agent. The ink pigment fixation agent functions to chemically, physically, and/or electrostatically bind the colorant pigments in the ink at or near the outer surface of the print medium. The ink pigment fixation agent can reduce the ink drying time. The resulting printed image can also have a high degree of water-fastness, smear-fastness, and image stability.

In general, the ink pigment fixation agent is a cationic fixation agent. Cationic fixation agent for ink pigments cause the anionic ink pigments to crash onto the surface of the print medium when in contact, thus fixing them to the surface when printed.

The ink pigment fixation agent may comprise a metallic salt.

The metallic salt includes a metallic cation. The metallic cation may be selected from calcium, sodium, copper, nickel, magnesium, zinc, barium, iron, aluminium and chromium ions. In one example, the metallic cation is calcium.

The metallic salt includes an anion. The anion may be selected from carboxylate, chloride, iodide, bromide, nitrate, sulfate, phosphate, chlorate ions and a combination thereof. When the anion is a carboxylate ion, then the carboxylate ion may be a $C_1$-$C_6$ carboxylate ion, such as a formate ion, an acetate ion or a propionate ion. The term "$C_1$-$C_6$" in the context of a carboxylate ion refers a carboxylate ion comprising 1 to 6 carbon atoms.

In one example, the anion is an acetate ion or a propionate ion.

For the avoidance of doubt, when the anion is a carbonate ion, then the metallic salt is not an ink pigment fixation agent. A carbonate ion is not a carboxylate ion.

Examples of the metallic salt includes sodium chloride, aluminium chloride, aluminium bromide, aluminium sulfate, aluminium nitrate, aluminium acetate, barium chloride, barium bromide, barium iodide, barium nitrate, calcium chloride, calcium bromide, calcium iodide, calcium nitrate, calcium acetate, calcium propionate, copper chloride, copper bromide, copper sulfate, copper nitrate, copper acetate, iron chloride, iron bromide, iron iodide, iron sulfate, iron nitrate, magnesium chloride, magnesium bromide, magnesium iodide, magnesium sulfate, magnesium nitrate, magnesium acetate, nickel chloride, nickel bromide, nickel sulfate, nickel nitrate, nickel acetate, zinc chloride, zinc bromide, zinc sulfate, zinc nitrate, zinc acetate; or combinations thereof. In one example, the metallic salt includes sodium chloride, aluminium chloride, calcium chloride, calcium nitrate, calcium propionate, magnesium chloride, or a combination thereof.

The ink pigment fixation may, for example, be a calcium $C_1$-$C_6$ carboxylate, such as calcium propionate.

The coating composition may include an amount of ink pigment fixation agent of about 0.01 wt % to about 10.0 wt %, such as about 0.1 wt % to about 7.5 wt %. The coating composition may include an amount of the ink pigment fixation of about 0.5 wt % to about 5.0 wt %, such as about 0.75 wt % to about 2.5 wt %.

The coating composition may further include a pigment and/or a polymeric binder.

Generally, the coating composition includes a pigment, such as an inorganic pigment. The pigment may be a particulate pigment.

The inorganic pigment may be a white inorganic pigment. The term "white inorganic pigment" refers to a pigment with high brightness and/or whiteness.

The white inorganic pigment may be calcium carbonate, such as particles of calcium carbonate. The calcium carbonate can be ground calcium carbonate (GCC) (e.g. mechanically GCC) or precipitated calcium carbonate (PCC) (e.g. chemically produced PCC). For example, GCC 60 is suitable for use, which has an average particle diameter (D50) of 1.5 μm.

As the base paper may be from mechanical wood-containing pulps, it has a tendency to impart a "yellowing effect" when it is exposed to the light. To reduce paper yellowing, it is desirable to have a coating composition, which provides good coverage for the base paper and is stable when exposed to light. The porous clay may cover the fibers at the surface of the base paper so as to smooth out the paper surface, and consequently, the surface smoothness of the paper is increased. The presence of the porous clay may also reduce the yellowing effect of the mechanical pulp fibers over time, thereby increasing brightness and whiteness of the paper. In addition, the inorganic pigment, such as a white inorganic pigment, further acts to increase the opacity of the paper. Increasing the opacity reduces the likelihood of a printed image formed on one side of the paper from being visible on the opposite side of the paper.

In one example, the white inorganic pigment is only calcium carbonate. No other pigments or fillers may be present.

In another example, the inorganic pigment may be selected from any inorganic pigment with a low surface area, such as defined below.

The inorganic pigment is a white inorganic pigment, which may be selected from aluminium silicate; silica; alumina; titanium dioxide; aluminium hydroxide ($Al(OH)_3$); and zirconium oxide ($ZrO_2$). The inorganic pigment may be a mixture of calcium carbonate and either a low surface area aluminium silicate, silica, alumina, titanium dioxide, aluminium hydroxide or zirconium oxide ($ZrO_2$).

The low surface area aluminium silicate has a surface area less than 70 $m^2/g$, such as less than 50 $m^2/g$ or, for example, less than 30 $m^2/g$. The silica may be fumed silica, colloidal silica or a silica gel. The alumina may be fumed alumina.

When there is a mixture of calcium carbonate and a second inorganic pigment (e.g. low surface area aluminium silicate, silica etc), then particles of the calcium carbonate may be co-dispersed with particles of the second inorganic pigment.

When the inorganic pigment is a low surface area aluminium silicate or a mixture thereof with calcium carbonate, then the wt % ratio of the porous clay to the non-calcium carbonate inorganic pigment in the coating composition is from about 1:20 to about 1:2, such as 1:10 to 1:3.

In general, the coating composition can include a total amount of pigment, such as inorganic pigment or white inorganic pigment, of about 40.0 wt % to about 95.0 wt %, such as about 45.0 wt % to about 90.0 wt % or about 50.0 wt % to 85.0 wt %. In one example, the coating composition may include a total amount of pigment, such as inorganic pigment or white inorganic pigment, of about 50.0 wt % to about 90.0 wt %, such as about 60.0 wt % to about 85.0 wt % or, for example, about 65.0 wt % to about 75.0 wt %.

The coating composition can have a weight ratio of the ink pigment fixation agent to the pigment of from about from about 1:100 to about 1:10, such as from about 1:75 to about 1:20 or, for example, from about 1:50 to about 1:30.

The coating composition may include a polymeric binder. The polymeric may be selected from a water-soluble polymeric binder, a dispersed polymeric binder and a mixture thereof.

In general, the coating composition can include a total amount of polymer binder of from about 1 wt % to about 25 wt %, such as from about 2 wt % to about 20 wt % or, for example, from about 5 wt % to about 15 wt %.

In one example, the polymeric binder is a mixture of a water-soluble polymeric binder and a dispersed polymeric binder.

The water-soluble polymer can bind to the inorganic pigment particles and to the base paper. This assists in the formation of a coating layer on the base paper from the coating composition.

The water-soluble polymer can have hydrophilic functional groups, such as —OH (hydroxy), —COOH (carboxylic acid), —COO— (ether).

The water-soluble polymer may be a polyvinyl alcohol; a protein, such as casein or soy protein; a polysaccharide; cellulose; a cellulose derivative, such as a cellulose ether; an alginate; a starch; a polyvinyl pyrrolidone; an acrylamide polymer; or gelatin. In one example, the water-soluble polymer is a polyvinyl alcohol.

The term "water-soluble" as used herein in the context of a polymer refers to a polymer that is at least slightly soluble in water (at least 100 mass parts of water required to dissolve 1 mass part of the polymer) at room temperature (20° C.).

In general, the dispersed polymeric binder has a median particle size (D50) of from about 10 nm to about 5 μm, such as from about 25 nm to about 500 nm or, for example, from about 50 nm to about 250 nm.

The dispersed polymeric binder can be a polymeric latex, such as an acrylic emulsion, a styrene-butadiene emulsion, a vinyl acetate emulsion, a vinylidene chloride emulsion, a polyester emulsion, an acrylonitrile-butadiene latex, a polyvinyl acetate latex or a combination thereof.

The dispersed polymeric binder can have a weight average molecular weight (Mw) of about 5,000 to about 500,000. In one example, the dispersed polymeric binder has a weight average molecular weight (Mw) of about 50,000 to about 300,000.

The polymer of the dispersed polymeric binder may have a glass transition temperature ($T_g$) from about −30° C. to about 50° C., such as from about −30° C. to about 30° C. or, for example, from about −20° C. to about 20° C. A glass transition temperature ($T_g$) within these ranges may be desirable for forming films.

The water-soluble polymer and the dispersed polymeric binder may be included in the coating composition at a weight ratio of about 1:25 to about 1:1. Thus, the weight of dispersed polymeric binder is generally greater than the weight of the water-soluble polymer in the coating composition.

The coating composition may include a weight ratio of the water-soluble polymer to the dispersed polymeric binder of about 1:25 to about 24:25, such as about 1:20 to about 1:2 or, for example, about 1:15 to about 1:5.

If the amount of water-soluble polymer is excessive, then it can cause poor wet durability of the resulting print and excessive high viscosity of the coating composition mix used to form the coating layer. On the other hand, if the amount of the dispersed polymeric binder in the coating composition is too high, then the excessive amounts of this material can cause an interaction with the ink pigment fixation agent and can result in an unstable coating composition.

The coating composition may include a surfactant (also referred to herein as a "dispersant").

The surfactant may be a cationic surfactant, an anionic surfactant, a zwitterionic surfactant or a nonionic surfactant. The ink pigment fixation agents are generally not compatible with other components of the coating composition. The surfactant bridges the charge dissimilarity of the components to allow a low viscosity, stable coating composition to be obtained, which, in turn, contributes to formation of a smooth coated print medium surface.

In one example, the surfactant is a nonionic surfactant. The nonionic surfactant can be an ethoxylate surfactant, such as a fatty alcohol ethoxylate surfactant, an alkylphenol ethoxylate surfactant, a fatty acid ethoxylate surfactant, or an ethoxylated amine surfactant.

In another example, the surfactant is a fatty alcohol ethoxylate surfactant.

The coating composition may include an amount of surfactant of about 0.01 wt % to about 5.0 wt %, such as about 0.1 wt % to about 2.5 wt % or, for example, about 0.1 wt % to about 1.0 wt %.

In one example, the coating composition comprises a porous clay, an ink pigment fixation agent, a pigment, a polymeric binder and a surfactant (all as described hereinabove).

The coating composition may further include a pH control agent and/or a rheology control agent. These agents may be included to optimise the characteristics of the coating composition for processing.

For the avoidance of doubt, the amounts above of each component of the coating composition relate to dry weights, unless the context indicates otherwise.

The present disclosure also relates to a print medium. The print medium is used for inkjet printing, such as in high speed inkjet web presses.

The print medium comprises a base paper. The base paper is the paper component of the print medium.

The base paper can be a printing paper.

The base paper comprises paper fibers. The paper fibers can be obtained from a chemical pulp or a mechanical pulp.

Both a chemical and mechanical pulping processes yield cellulose fibers from different types of trees. Chemical pulp or fibers processed through chemical treatment, tend to have better strength and make whiter base media with better light resistance. Mechanical pulp or fibers processed using mechanical force tend to have weak paper strength, but higher opacity, but tend to turn yellow over time with UV exposure. The coating composition of the present disclosure can enable high speed printing while achieving improved image quality and instant durability of the printed image.

In general, the base paper includes from about 70 wt % to about 99 wt % cellulose fiber, such as from about 75 wt % to about 95 wt % cellulose fiber.

In one example, about 30 wt % of the cellulose fiber is a mechanical pulp. Thus, the cellulose fiber includes from about 0 wt % to about 30 wt % mechanical pulp. The cellulose fibers includes from about 70 wt % to about 100 wt % of chemical pulp, such as about 70 wt % to about 99 wt %.

In another example, the cellulose fiber includes from about 30 wt % to about 100 wt % of mechanical pulp, such as from about 50 wt % to about 99 wt % mechanical pulp. The cellulose fiber may include from about 75 wt % to about 100 wt % mechanical pulp, such as from about 90 wt % to about 100 wt % mechanical pulp.

One benefit of a base paper containing mechanical pulp is good opacity, even at low basis weight. It also has a lower cost compared to chemical pulp.

Chemical pulp can be used with the mechanical pulp, such as when the coating composition does not have as much covering power as other thicker coating compositions. It may also be used when having a slightly discoloured (non-white) print medium is not paramount, such as in high volume print jobs like "newsprint" type publication jobs where the life cycle of the printed products is limited.

By using some chemical pulp, there may be less yellowing of the base paper, and a whiter and more optically bright print medium can be prepared that lasts for a more extended period of time, even with the use thinner and/or less expensive coating compositions.

The base paper may have an ISO brightness of less than about 85%, such as from about 65% to about 80%, for example. The base paper may have such an ISO brightness when about 20 wt % to about 100 wt % mechanical pulp is present.

The base paper may include an inorganic pigment filler. Thus, the base paper may include paper fibers and an inorganic pigment filler.

Generally, the base paper may include from about 5 wt % to about 25 wt % of inorganic pigment filler.

The inorganic pigment filler may be calcium carbonate, such as precipitated calcium carbonate (PCC) or ground calcium carbonate (GCC); clay; titanium dioxide; or a combination thereof.

In one example, the inorganic pigment filler is calcium carbonate, such as precipitated calcium carbonate or ground calcium carbonate.

In another example, the inorganic pigment filler is a combination of calcium carbonate and titanium dioxide. The inorganic pigment filler may include from about 1 wt % to about 30 wt % titanium dioxide (e.g. the remainder being calcium carbonate).

In general, the base paper may not include a clay.

The base paper may also include an additive, such as an internal sizing agent, a dry strength agent, a wet strength agent, a dye, an optical brightening agent or a combination thereof.

The base paper may have a surface roughness of up to 6 µm based on the PPS (Parker Print Surf) test.

The base paper can have a basis weight of about 35 gsm to about 250 gsm, such as about 40 gsm to about 200 gsm.

The print medium also includes a coating layer disposed on a surface of the base paper. The coating layer may be directly disposed on a surface of the base paper. Thus, the coating layer is in direct contact with a surface of the base paper (e.g. there are no intervening layers).

The print medium may comprise a plurality of coating layers.

In general, the or each coating layer comprises a coating composition, such as defined hereinabove. Thus, the coating composition is used to form the coating layer. When the coating layer comprises the coating composition, then the coating layer comprises the ink pigment fixation agent because it is present in the coating composition. The ink pigment fixation will then be disposed at a surface of the coating layer.

The or each coating layer may have a coat weight of about 1 gsm to 50 gsm, such as from about 5 gsm to about 40 gsm.

The coat weight may, for example, be about 5 gsm to about 25 gsm, such as from about 7.5 gsm to about 15 gsm.

In one example, the print medium has a single coating layer. This coating layer is disposed on a surface of the base paper. The coating layer may be directly disposed on the surface of the base paper. This arrangement is shown in FIG. 1, where a coating layer (200) is disposed on the base paper (100). The coating layer can be the topmost layer of the print medium (e.g. the surface to which inkjet ink is applied).

In another example, the print medium has a coating disposed on a surface of the base paper. The print medium also has a layer comprising the ink pigment fixation agent (referred to herein as an "ink pigment fixation layer"). The ink pigment fixation layer is disposed on the coating layer, such as a surface of the coating layer. The ink pigment fixation layer can be the topmost layer of the print medium.

In this example, the coating layer may comprise a coating composition as described hereinabove (e.g. it comprises a porous clay and an ink pigment fixation agent etc.). Alternatively, the coating layer may comprise a coating composition as described hereinabove, except that the coating layer does not comprise the ink pigment fixation agent.

In a further example, the print medium has a first coating layer disposed on a surface of the base paper, and a second coating layer disposed on the first coating layer, such as on a surface of the first coating layer. The first coating layer may be directly disposed on the surface of the base paper. The second coating layer may be directly disposed on the first coating layer.

The first coating layer and the second coating layer may each independently comprise a coating composition as described hereinabove. Thus, both the first coating layer and the second coating layer include an ink pigment fixation agent.

The first coating layer may have a coating composition that is the same or different to the coating composition of the second coating layer. The coating composition of the first coating layer is, in general, different to the coating composition of the second coating layer.

The second coating layer can be the topmost layer of the print medium.

In another example, the print medium has a first coating layer disposed on a first surface of the base paper, and a second coating layer disposed on a second surface of the base paper. The first coating layer may be directly disposed on the first surface of the base paper and/or the second coating layer may be directly disposed on the second surface of the base paper.

The first coating layer and the second coating layer may each independently comprise a coating composition as described hereinabove. Both the first coating layer and the second coating layer may include an ink pigment fixation agent.

The first coating layer may have a coating composition that is the same or different to the coating composition of the second coating layer.

The first surface is on one side of the base paper and the second surface is on the other side of the base paper (e.g. the first surface and the second surface are on opposite sides of the base paper). Thus, the first surface may, for example, be the topside of the base paper and the second surface may be the underside of the base paper.

Figure 2:
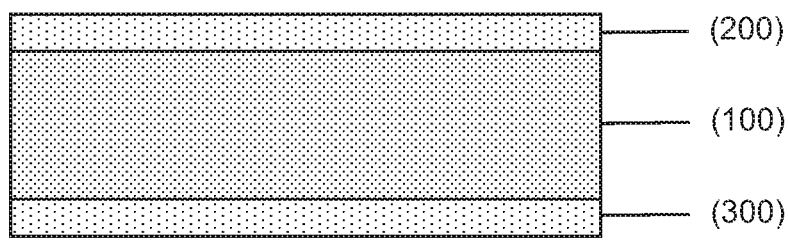
FIG. 2 shows an example of a cross-sectional view of a print medium in accordance with the present disclosure.

This arrangement is shown in FIG. 2, where a first coating layer (200) is disposed on a first surface (e.g. "one side" or the topside) of the base paper (100). A second coating layer (300) is disposed on a second surface (e.g. the "other side" or the underside) of the base paper (100).

The first coating layer may be the topmost layer of the print medium (e.g. the surface to which inkjet ink is applied) on the first surface.

The second coating layer may be the topmost layer of the print medium (e.g. the surface to which inkjet ink is applied) on the second surface.

In a further example, the print medium comprises a first coating layer disposed on a first surface of the base paper, and a second coating layer disposed on the first coating layer, such as on a surface of the first coating layer. The first coating layer may be directly disposed on the first surface of the base paper. The second coating layer may be directly disposed on the first coating layer.

In this example, the print medium may further comprise a third coating layer disposed on a second surface of the base paper. The third coating layer may be directly disposed on the second surface of the base paper.

The print medium may include a fourth coating layer disposed on the third coating layer, such as a surface of the third coating layer. The fourth coating layer may be directly disposed on the third coating layer.

The first coating layer and the second coating layer may each independently comprise a coating composition as described hereinabove. Both the first coating layer and the second coating layer may include an ink pigment fixation agent.

The first coating layer may have a coating composition that is the same or different to the coating composition of the second coating layer. The coating composition of the first coating layer is, in general, different to the coating composition of the second coating layer.

The third coating layer may comprise a coating composition as described hereinabove. The third coating layer may include an ink pigment fixation agent.

The third coating layer may have a coating composition that is the same or different to the coating composition of the first coating layer. The coating composition of the third coating layer is, in general, the same as the coating composition of the first coating layer.

The fourth coating layer may comprise a coating composition as described hereinabove. The fourth coating layer may include an ink pigment fixation agent.

The fourth coating layer may have a coating composition that is the same or different to the coating composition of the third coating layer. The coating composition of the fourth coating layer is, in general, different to the coating composition of the third coating layer.

The fourth coating layer may have a coating composition that is the same as the coating composition of the second coating layer.

As mentioned above, the first surface is on one side of the base paper and the second surface is on the other side of the base paper (e.g. the first surface and the second surface are on opposite sides of the base paper). Thus, the first surface may, for example, be the topside of the base paper and the second surface may be the underside of the base paper.

Figure 3:
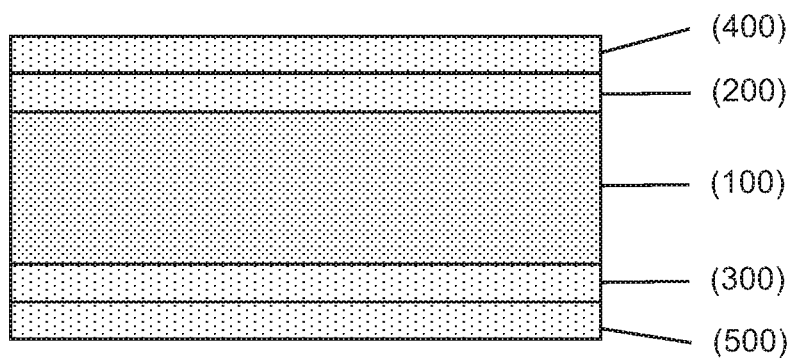
FIG. 3 shows an example of a cross-sectional view of a print medium in accordance with the present disclosure.

The arrangement of this example is shown in FIG. 3, where a first coating layer (200) is disposed on a first surface (e.g. "one side" or the topside) of the base paper (100). A second coating layer (400) is disposed on the first coating layer (200). A third coating layer (300) is disposed on a second surface (e.g. "other side" or underside) of the base paper (100). A fourth coating layer (500) is disposed on the third coating layer (300).

The second coating layer may be the topmost layer of the print medium (e.g. the surface to which inkjet ink is applied) on the first surface.

The fourth coating layer may be the topmost layer of the print medium (e.g. the surface to which inkjet ink is applied) on the second surface.

The print medium of the present disclosure may not have a transparent overcoat. It may not be necessary to apply a transparent overcoat after printing an image on the print medium.

The present disclosure also relates to a method of preparing a print medium for inkjet printing. The method comprises applying the coating composition onto a surface of the base paper. The coating composition is applied onto a surface of the base paper to produce a coating layer.

The coating composition may be applied onto a surface of the base paper by calendaring. The coating composition may be calendered onto a surface of the base paper at a pressure from about 500 psi to about 3500 psi and/or at a temperature from room temperature (20° C.) to 160° C.

When the coating composition is applied onto a surface of the base paper, the coating composition has a pH of about 5 to about 8. Maintaining the pH within this range may be necessary for processing. The coating composition may have its pH adjusted to be from about 5 to about 8 by pre-mixing adjustment or by in-processing adjustment.

When the print medium comprises a second coating layer, then a second coating composition may be applied onto a surface of the first coating layer, such as by calendaring as described above.

The coating composition may be applied to the opposite side of the base paper using the method described above.

The term "particle size" as used herein, such as in the context of the porous clay, the inorganic pigment or the dispersed polymeric binder, refers to an equivalent spherical diameter (ESD). Thus, a median particle size may also be referred to as a median ESD. The ESD of an irregularly shaped particle is the diameter of a sphere having an equivalent volume. The particle size can be presented as a distribution, such as a normal distribution. The term "D50" refers to the median particle size (at the 50th percentile). For example, a D50 value of 25 μm means that 50% of the particles (by volume) have a particle size greater than 25 μm and 50% of the particles have a particle size less than 25 μm. Particle size measurements can be measured with a particle size distribution analyzer designed on the principle of laser diffraction scattering. The particle size distribution analyzer may be a particle size distribution analyzer designed on the principle of dynamic light scattering, such as a Microtrac-UA150.

EXAMPLES

The present disclosure will now be illustrated by the following non-limiting example.

Preparation of Print Media

Samples of base paper were coated with a composition as shown in Table 1, where the amounts are in dry weight %. The compositions shown in Table 1 were coated on a 50 g/m² base paper in an amount of 10 g/m² using a table top blade coater, then calendered using a lab soft-calender.

TABLE 1

| Ingredient | Description | Coating No. 1 | 2 | 3 | 4 |
| --- | --- | --- | --- | --- | --- |
| Covercarb ™ 85 | Ground Calcium Carbonate | 71.9 | 70.6 | 71.9 | 70.6 |
| Kamin ™ 2000C | Low Surface Area Clay | 18.0 | 17.7 | — | — |
| Fulacolor ™ XW | High Surface Area Clay | — | — | 18.0 | 17.7 |
| Disponil ™ AFX 4030 | Dispersant | 0.3 | 0.3 | 0.3 | 0.3 |
| Litex ™ PX9740 | Latex | 9.0 | 8.8 | 9.0 | 8.8 |
| Mowiol ™ 18-88 | PVOH | 0.9 | 0.9 | 0.9 | 0.9 |
| Calcium Propionate | Ink Pigment Fixation Agent | 0.0 | 1.8 | 0.0 | 1.8 |

The compositions of coatings 1 to 3 are comparative examples.

Coatings 1 and 2 include a low surface area clay (Kamin™ 2000C). This clay is a calcined kaolin clay having a surface area of 16 m²/g and a median particle size (D50) of 1.5 microns. It also has an oil absorption of 65 g/100 g.

Coatings 3 and 4 include a high surface area clay (Fulacolor™ XW). This clay is an acid-leached bentonite clay having a surface area of 285 m²/g and a median particle size (D50) of 4.4 microns. It also has an oil absorption of 108 g/100 g. Coating 3 does not include an ink pigment fixation agent. Coating 4 is a representative example of the present disclosure.

The values for the surface area, median particle size and oil absorption were determined as described hereinabove.

Tests on the Print Media

The print media prepared from each of the coating compositions shown in Table 1 above were then printed using an HP test bed, which mimics the HP Web Press with web press inkjet inks in the pens. The prints were printed at 100 fpm with a 5 s dry time.

Image Quality

The image quality (coalescence) of an image printed with the HP test bed was checked by scanning an ink density ramp to track coalescence changes at increasing ink densities. The results are then rated using a 1 to 5 scale with 5 representing no coalescence, and 1 representing poor coalescence. The results are shown in Table 3 below.

Durability

The durability (mechability & instant eraser rub tests) of an image printed with the HP test bed was checked by printing a strip of a secondary (blue-magenta & cyan) color onto a sample of each print medium at 100 fpm with a 5 s dry time.

For mechability, an anodized aluminium roller heated to 100° C. was rolled over the printed image in 3 passes (each pass is one cycle, down the printed image and back to the top). The image was then rated using a 1 to 5 scale with 5 representing no damage, and 1 representing total ink removal from the image.

For the instant eraser rub, a pencil eraser was mounted on a force spring to provide a consistent and reproducible pressure. The eraser tip was pressed against the print and drawn across the print. The image was then rated using a 1 to 5 scale with 5 representing no damage, and 1 representing total ink removal from the image.

TABLE 2

Key describing durability values

| Value | Meaning |
|---|---|
| 5 | No Damage |
| 4 | Very slight damage |
| 3 | Some of ink gone |
| 2 | >50% of ink removed |
| 1 | See white paper, ink total damage or transfer |

Results

The results from the tests are shown in Table 3 below.

TABLE 3

Results

| | Coating No. | | | |
|---|---|---|---|---|
| Test | 1 | 2 | 3 | 4 |
| Coalescence | 1 | 4 | 2 | 5 |
| Mechability | 2 | 3 | 4 | 4 |
| Instant Eraser Rub | 2 | 3 | 4 | 5 |

The effect associated with including the acid treated high surface area clay instead of the low surface area clay can be seen by comparing coating 3 with coating 1 and coating 4 with coating 2. Both coatings 3 and 4 show an improved instant durability performance in comparison to coatings 1 and 2 respectively. This is demonstrated by the superior mechability and instant eraser rub test results.

Coatings 3 and 4 also show an improved coalescence when compared to coatings 1 and 2 respectively.

Coating 2 contains an ink pigment fixation agent and a low surface area clay. Coating 2 showed good coalescence, but the result was not good enough to meet the minimum requirement for this parameter.

In the coatings containing an ink pigment fixation agent, the replacement of the low surface area clay (coating 2) with the high surface area clay (coating 4), the coalescence improved and passed the minimum coalescence requirement.

When comparing the coatings containing the high surface area clay (coatings 3 and 4), the addition of the ink pigment fixation agent to the coating composition further improved coalescence and the instant durability.

The invention claimed is:

1. A coating composition for a base paper, comprising:
   about 5.0 wt % to about 50 wt % of a porous clay comprising an alumina-silicate that is acid etched; and
   about 0.1 wt % to about 10% wt % of an ink pigment fixation agent comprising a metallic salt;
   wherein the porous clay has a surface area from about 100 m2/g to about 400 m2/g;
   and wherein the coating composition has a pH of from 5 to 8.

2. The coating composition of claim 1, wherein the porous clay has an oil absorption of 80 to 150 g oil/100 g and include particles having a medium particle size of about 1.5 micron to about 10 microns.

3. The coating composition of claim 1, wherein the porous clay includes a hydrous aluminium phyllosilicate and has the surface area from about 200 m2/g to about 350 m2/g.

4. The coating composition of claim 1, which includes an amount of the porous clay of about 10.0 wt % to about 25.0 wt %.

5. The coating composition of claim 1, wherein the porous clay does not include silica, alumina, fumed silica, or fumed alumina.

6. The coating composition of claim 1, wherein the metallic salt includes an anion selected from carboxylate, chloride, iodide, bromide, nitrate, sulfate, sulfite, phosphate, chlorate ions and a combination thereof.

7. The coating composition of claim 1, wherein the metallic salt includes a metallic cation selected from calcium, sodium, copper, nickel, magnesium, zinc, barium, iron, aluminium and chromium ions.

8. The coating composition of claim 1, which includes an amount of ink pigment fixation agent of about 0.5 wt % to about 5.0 wt %.

9. The coating composition of claim 1, comprising about 1.0 wt % to about 25 wt % of a polymeric binder.

10. The coating composition of claim 9, wherein the polymeric binder is selected from a water-soluble polymeric binder, a dispersed polymeric binder and a mixture thereof.

11. A print medium for inkjet printing comprising:
   a base paper;
   a coating layer disposed on a surface of the base paper, wherein the coating layer comprises about 5.0 wt % to about 50 wt % of a porous clay comprising an alumina-silicate that is acid etched, the porous clay having a surface area from about 100 m2/g to about 400 m2/g; and
   about 0.1 wt % to about 10.0 wt % of an ink pigment fixation agent comprising a metallic salt and disposed at a surface of the coating layer,
   wherein the coating layer has a pH of from 5 to 8.

12. The print medium of claim 11, wherein the base paper has a basis weight of 35 to 250 gsm.

13. The print medium of claim 11, wherein either (a) the coating layer comprises the ink pigment fixation agent or (b) a layer comprising the ink pigment fixation agent is disposed on the coating layer.

14. A method of preparing a print medium for inkjet printing, the method comprising:
   applying a coating composition onto a surface of a base paper, wherein the coating composition comprises about 5.0 wt % to about 50 wt % of a porous clay that is acid etched and about 0.1 wt % to about 10 wt % of an ink pigment fixation agent comprising a metallic salt, wherein the porous clay comprises an alumina-silicate, and has a surface area from 100 m2/g to 400 m2/g;
   and wherein the coating composition has a pH of from 5 to 8.

15. A coating composition for a base paper, comprising:
   about 5.0 wt % to about 50 wt % of a porous clay comprising an alumina-silicate that is acid etched; and
   about 0.1 wt % to about 10% wt % of an ink pigment fixation agent comprising a metallic salt;
   wherein the porous clay has a surface area from about 100 m2/g to about 400 m2/g;
   and wherein the coating composition further comprises about 50 wt % to about 85 wt % of a pigment.

16. The coating composition of claim 15, wherein the coating composition has a pH of from 5 to 8.

17. The coating composition of claim 15, wherein the pigment comprises an inorganic pigment, and the wt % ratio of the porous clay to the inorganic pigment in the coating composition is from about 1:10 to about 1:3.

18. The coating composition of claim 15, wherein the coating composition comprises a weight ratio of the ink pigment fixation agent to the pigment from about 1:100 to about 1:10.

19. A coating composition of for a base paper, comprising:
about 10.0 wt % to about 25.0 wt % of a porous clay comprising an alumina-silicate that is acid etched;
about 0.5 wt % to about 5.0 wt % of an ink pigment fixation agent comprising a metallic salt;
about 50 wt % to about 85% of a pigment;
about 1.0 wt % to about 25 wt % of a polymeric binder; and
about 0.01 wt % to about 5.0 wt % of a surfactant;
wherein the porous clay has a surface area from about 100 m2/g to about 400 m2/g.

* * * * *